United States Patent
Behravan et al.

(10) Patent No.: US 12,185,356 B2
(45) Date of Patent: Dec. 31, 2024

(54) UPLINK TRANSMISSION PRE-EMPTION

(71) Applicant: Telefonaktiebolaget LM Ericsson (publ), Stockholm (SE)

(72) Inventors: Ali Behravan, Stockholm (SE); Robert Baldemair, Solna (SE); Sorour Falahati, Stockholm (SE); Jonas Fröberg Olsson, Ljungsbro (SE); Bikramjit Singh, Kirkkonummi (FI); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 449 days.

(21) Appl. No.: 17/611,261

(22) PCT Filed: May 13, 2020

(86) PCT No.: PCT/EP2020/063364
§ 371 (c)(1),
(2) Date: Nov. 15, 2021

(87) PCT Pub. No.: WO2020/229555
PCT Pub. Date: Nov. 19, 2020

(65) Prior Publication Data
US 2022/0210793 A1 Jun. 30, 2022

Related U.S. Application Data

(60) Provisional application No. 62/847,154, filed on May 13, 2019.

(51) Int. Cl.
*H04W 72/56* (2023.01)
*H04W 72/0446* (2023.01)
*H04W 72/23* (2023.01)

(52) U.S. Cl.
CPC ....... *H04W 72/56* (2023.01); *H04W 72/0446* (2013.01); *H04W 72/23* (2023.01)

(58) Field of Classification Search
None
See application file for complete search history.

(56) References Cited

U.S. PATENT DOCUMENTS

2019/0230683 A1* 7/2019 Akkarakaran .... H04W 72/1268
2019/0349180 A1* 11/2019 Lu ................. H04L 27/2607

FOREIGN PATENT DOCUMENTS

CN 109328481 A 2/2019
EP 3462796 A1 4/2019
(Continued)

OTHER PUBLICATIONS

International Search Report and Written Opinion dated Jun. 17, 2020 for International Application No. PCT/EP2020/063364 filed May 13, 2020, consisting of 15 pages.
(Continued)

*Primary Examiner* — Chi H Pham
*Assistant Examiner* — Raul Rivas
(74) *Attorney, Agent, or Firm* — Weisberg I.P. Law, P.A.

(57) ABSTRACT

A method, system, network node and wireless device are disclosed. According to one or more embodiments, a wireless device is provided. The wireless device includes processing circuitry configured to: receive a pre-emption indication indicating a pre-emption time period for pre-empting an uplink transmission during the pre-emption time period; cancel at least a first portion of a first uplink transmission that is arranged to occur during the pre-emption time period; and if the first uplink transmission includes a second portion arranged to occur before the pre-emption time period, cancel the second portion of the first uplink transmission based on a temporal criterion being met.

17 Claims, 13 Drawing Sheets

(56) References Cited

FOREIGN PATENT DOCUMENTS

| WO | 2018142376 A1 | 8/2018 |
|---|---|---|
| WO | 2019016951 A1 | 1/2019 |

OTHER PUBLICATIONS

3GPP TSG RAN WG1 #97 R1-1906150; Title: UL Inter-UE Tx prioritization for URLLC; Source: vivo; Agenda Item: 7.2.6.5; Document for: Discussion and Decision; Date and Location: May 13-17, 2019, Reno, USA; consisting of 13 pages.
3GPP TSG-RAN WG1 #97 R1-1907285; Title: Uplink inter-UE Tx Multiplexing and Prioritization; Agenda item: 7.2.6.5; Source: Qualcomm Incorporated; Document for: Discussion/Decision; Date and Location: May 13-17, 2019, Reno Nevada, USA; consisting of 7 pages.
3GPP TS 38.213 V15.5.0; Title: 3rd Generation Partnership Project; Technical Specification Group Radio Access Network; NR; Physical layer procedures for control (Release 15); Mar. 2019; consisting of 104 pages.
Japanese Office Action and English Summary dated Jan. 13, 2023 for Application No. 2021568416, consisting of 9 pages.
3GPP TSG RAN WG1 Meeting #92 R1-1804572; Title: Discussion on multiplexing UL transmission with different requirements; Agenda Item: 7.2.4; Source: LG Electronics; Document for: Discussion and decision; Location and Date: Athens, Greece, Feb. 26-Mar. 2, 2018, consisting of 10 pages.
3GPP TSG-RAN WG1 Meeting #97 R1-1907456; Title: HARQ and scheduling enhancements for NR-U; Agenda Item: 7.2.2.2.3; Source: Ericsson; Document for: Discussion, Decision; Location and Date: Reno, NV, USA, May 13-17, 2019, consisting of 15 pages.
3GPP TSG RAN WG1 Meeting #97 R1-1906756; Title: UL inter-UE eMBB and URLLC multiplexing enhancements; Agenda Item: 7.2.6.5; Source: Nokia, Nokia Shanghai Bell; Document for: Discussion and Decision; Location and Date: Reno, USA, May 13-17, 2019, consisting of 15 pages.
Chinese Office Action and English Summary dated Sep. 10, 2023 for Application No. 202080050416.8, consisting of 11 pages.

\* cited by examiner

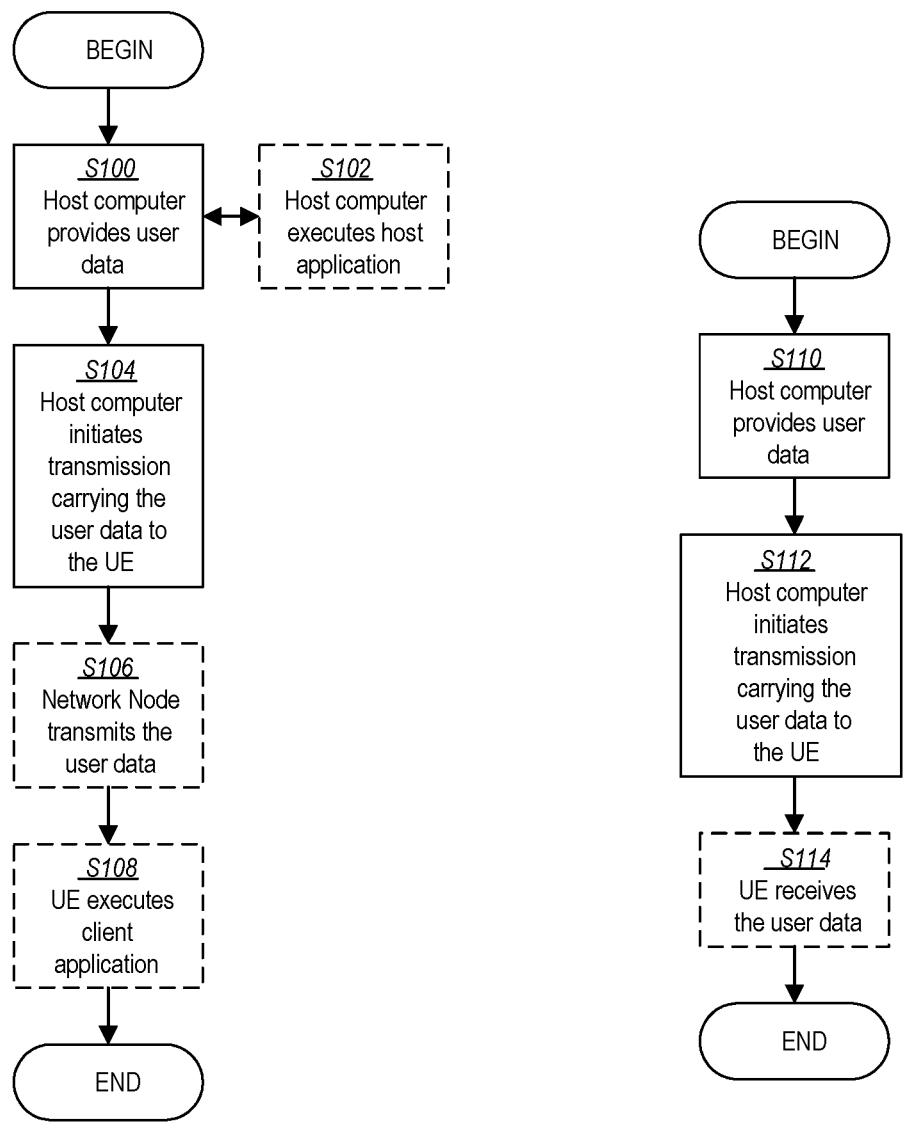

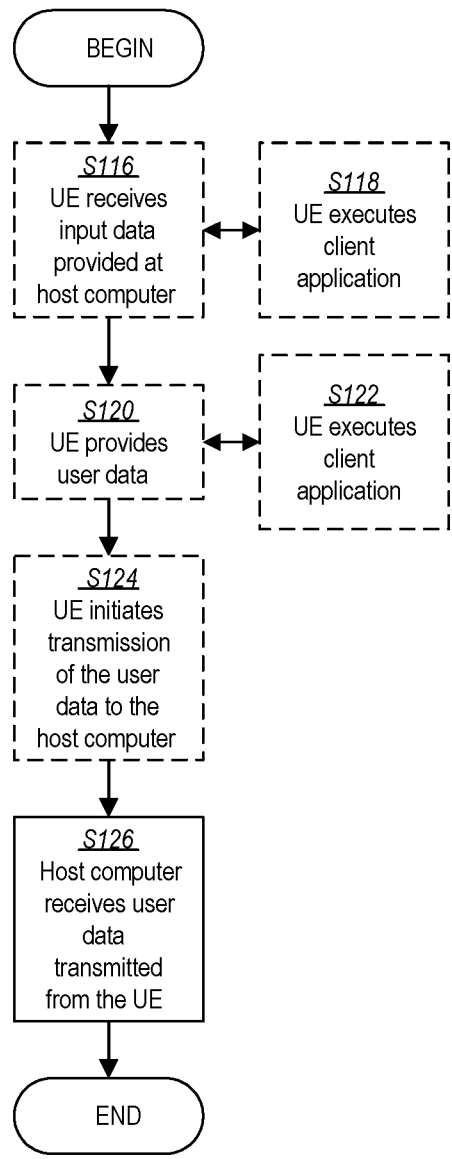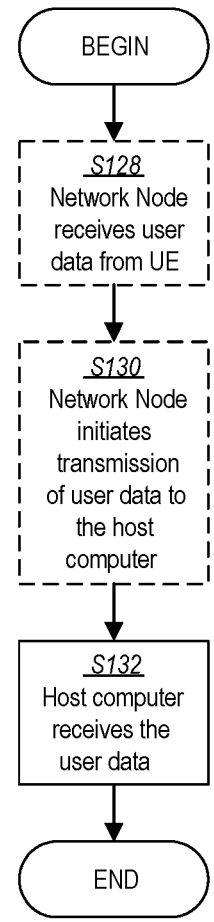
FIG. 5
FIG. 6

UPLINK TRANSMISSION PRE-EMPTION

CROSS-REFERENCE TO RELATED APPLICATIONS

This application is a Submission Under 35 U.S.C. § 371 for U.S. National Stage Patent Application of International Application No.: PCT/EP2020/063364, filed May 13, 2020 entitled "UPLINK TRANSMISSION PRE-EMPTION," which claims priority to U.S. Provisional Application No. 62/847,154, filed May 13, 2019, entitled "UE BEHAVIOR UPON RECEIVING UL TRANSMISSION PRE-EMPTION," the entireties of both of which are incorporated herein by reference.

TECHNICAL FIELD

The present disclosure relates to wireless communications, and in particular, a pre-emption action associated with an uplink (UL) pre-emption indication.

BACKGROUND

Ultra-reliable and low latency communication (URLLC) is one use case of $5^{th}$ Generation (5G) communication technology (also known as new radio (NR)) being developed by the Third Generation Partnership Project (3GPP). URLLC may have strict requirements on transmission reliability and latency, i.e., 99.9999% reliability within 1 ms one-way latency. In NR (i.e., third generation partnership project (3GPP)) Release (Rel)-15, several new features and enhancements were introduced to support these requirements. In NR Rel-16, standardization works are focused on further enhancing URLLC system performance as well as helping ensure reliable and efficient coexistent of URLLC and other NR use cases. One example scenario is when both enhanced mobile broadband (eMBB) and URLLC wireless devices co-exist in the same cell. At least two approaches have been identified to support multiplexing/prioritization.

A first approach is based on power control to increase the power of the wireless device 22 with URLLC service to make the wireless device 22 more resilient to interference from the eMBB wireless device(s). Power control for NR Release 15 wireless devices is specified for example, in 3GPP Technical Specification (TS) 38.213 V15.5.0, clause 7.1.1. One advantage of this option is that it does not require any changes in the behavior of the eMBB wireless device, hence this option works with NR Release 15 (Rel-15) wireless devices. One disadvantage with this option is that to guarantee the performance of the URLLC wireless device while being interfered with by eMBB traffic, the transmit power spectral density (PSD) of the URLLC wireless device may have to be increased significantly. However, wireless devices not in the close vicinity of the network node may not have the power budget to do this increase and may therefore experience much lower Signal to Interference and Noise Ratio (SINR) than is required by URLLC.

A second approach is based on a preemption indicator being transmitted from the network node to the interfering eMBB wireless device. When a URLLC wireless device is scheduled on time/frequency resources that are already scheduled to a lower priority eMBB wireless device, the network node, e.g., base station, can transmit a preemption indicator to the eMBB wireless device. Upon reception of this indicator, the eMBB wireless device may avoid transmitting on a set of preconfigured resources. The details of the preemption indicator and the wireless device behavior upon reception of this signal/indicator not currently defined.

SUMMARY

Some embodiments advantageously provide methods, systems, and apparatuses for establishing/taking at least one predefined pre-emption action associated with an uplink (UL) pre-emption indication.

The disclosure provides one or more methods for wireless device behavior upon reception of an UL pre-emption indication. In particular:
  Methods of pre-empting scheduled UL transmission are provided;
  Methods of pre-empting configured and semi-persistent UL transmission are provided; and
  Methods of pre-empting multi-segmented UL transmission with or without repetition over single or multi-slots are provided.

According to one aspect of the disclosure, a wireless device is provided. The wireless device includes processing circuitry configured to: receive a pre-emption indication indicating a pre-emption time period for pre-empting an uplink transmission during the pre-emption time period; cancel at least a first portion of a first uplink transmission that is arranged to occur during the pre-emption time period; and if the first uplink transmission includes a second portion arranged to occur before the pre-emption time period, cancel the second portion of the first uplink transmission based on a temporal criterion being met.

According to one or more embodiments of this aspect, the processing circuitry is further configured to, if the first uplink transmission includes a third portion arranged to occur after the pre-emption time period, cancel the third portion of the first uplink transmission. According to one or more embodiments of this aspect, if the first uplink transmission includes the second portion arranged to occur before the pre-emption time period, causing transmission of the second portion of the first uplink transmission based on the temporal criterion not being met. According to one or more embodiments of this aspect, the temporal criterion being met corresponds to a duration of a time window being greater than or equal to a processing time for the wireless device to drop the first uplink transmission where the duration of the time window is from reception of the pre-emption indication to the arranged start of first uplink transmission.

According to one or more embodiments of this aspect, the cancelling of at least the first portion of the first uplink transmission is based on the first uplink transmission being a non-RACH transmission, and where the processing circuitry is further configured to disregard the pre-emption indication for RACH transmission. According to one or more embodiments of this aspect, the cancelling of at least the first portion of the first uplink transmission is based on the first uplink transmission being a non-PUCCH transmission, and where the processing circuitry is further configured to disregard the pre-emption indication for PUCCH transmission. According to one or more embodiments of this aspect, the first uplink transmission is one of: a physical uplink shared channel transmission, and a physical uplink control channel transmission.

According to one or more embodiments of this aspect, in the cancelling of at least the first portion of the first uplink transmission is based on the first uplink transmission being of a lower priority than a second uplink transmission, and where the processing circuitry is further configured to cause transmission of the second uplink transmission during the pre-emption time period. According to one or more embodiments of this aspect, the first uplink transmission is part of a plurality of uplink transmissions corresponding to a multi-slot transmission repetition, and where the processing circuitry is further configured to cause transmission of the remaining plurality uplink transmissions that are arranged to occur outside of the pre-emption time period.

According to one or more embodiments of this aspect, the first uplink transmission is a segment in multi-segment uplink transmission, and where the processing circuitry is further configured to cause transmission of any segment in the multi-segment uplink transmission that is arranged to occur outside of the pre-emption time period. According to one or more embodiments of this aspect, the transmission of at least one of the segments in the multi-segment uplink transmission is based at least in part on a redundancy version of the at one of the segments. According to one or more embodiments of this aspect, the pre-emption indication is provided by downlink control information, DCI.

According to another aspect of the disclosure, a network node is provided. The network node includes processing circuitry configured to: transmit a pre-emption indication indicating a pre-emption time period for pre-empting an uplink transmission during the pre-emption time period; the pre-emption indication causing cancellation of at least a first portion of a first uplink transmission that is arranged to occur during the pre-emption time period; and if the first uplink transmission includes a second portion arranged to occur before the pre-emption time period, the pre-emption indication causes cancellation of the second portion of the first uplink transmission based on a temporal criterion being met.

According to one or more embodiments of this aspect, if the first uplink transmission includes a third portion arranged to occur after the pre-emption time period, the pre-emption indication causes cancellation of the third portion of the first uplink transmission. According to one or more embodiments of this aspect, the temporal criterion being met corresponds to a duration of a time window being greater than or equal to a processing time for the wireless device to drop the first uplink transmission, and where the duration of the time window is from reception of the pre-emption indication to the arranged start of first uplink transmission. According to one or more embodiments of this aspect, the causing of cancellation of at least the first portion of the first uplink transmission is based on the first uplink transmission being a non-RACH transmission.

According to one or more embodiments of this aspect, the cancelling of at least the first portion of the first uplink transmission is based on the first uplink transmission being a non-PUCCH transmission. According to one or more embodiments of this aspect, the first uplink transmission is one of: a physical uplink shared channel transmission; and a physical uplink control channel transmission. According to one or more embodiments of this aspect, the cancellation of at least the first portion of the first uplink transmission is based on the first uplink transmission being of a lower priority than a second uplink transmission.

According to one or more embodiments of this aspect, the first uplink transmission is part of a plurality of uplink transmissions corresponding to a multi-slot transmission repetition. According to one or more embodiments of this aspect, the first uplink transmission is a segment in multi-segment uplink transmission. According to one or more embodiments of this aspect, the pre-emption indication is provided by downlink control information, DCI.

According to another aspect of the disclosure, a method implemented by a wireless device is provided. A pre-emption indication indicating a pre-emption time period for pre-empting an uplink transmission during the pre-emption time period is received. At least a first portion of a first uplink transmission that is arranged to occur during the pre-emption time period is cancelled. If the first uplink transmission includes a second portion arranged to occur before the pre-emption time period, the second portion of the first uplink transmission is cancelled based on a temporal criterion being met. According to one or more embodiments of this aspect, if the first uplink transmission includes a third portion arranged to occur after the pre-emption time period, the third portion of the first uplink transmission is cancelled.

According to one or more embodiments of this aspect, if the first uplink transmission includes the second portion arranged to occur before the pre-emption time period, transmission of the second portion of the first uplink transmission is caused based on the temporal criterion not being met. According to one or more embodiments of this aspect, the temporal criterion being met corresponds to a duration of a time window being greater than or equal to a processing time for the wireless device to drop the first uplink transmission, and where the duration of the time window is from reception of the pre-emption indication to the arranged start of first uplink transmission. According to one or more embodiments of this aspect, the cancelling of at least the first portion of the first uplink transmission is based on the first uplink transmission being a non-RACH transmission, and the pre-emption indication for RACH transmission being disregarded.

According to one or more embodiments of this aspect, the cancelling of at least the first portion of the first uplink transmission is based on the first uplink transmission being a non-PUCCH transmission. The pre-emption indication for PUCCH transmission is disregarded. According to one or more embodiments of this aspect, the first uplink transmission is one of: a physical uplink shared channel transmission; and a physical uplink control channel transmission. According to one or more embodiments of this aspect, the cancelling of at least the first portion of the first uplink transmission is based on the first uplink transmission being of a lower priority than a second uplink transmission. Transmission of the second uplink transmission is caused during the pre-emption time period.

According to one or more embodiments of this aspect, the first uplink transmission is part of a plurality of uplink transmissions corresponding to a multi-slot transmission repetition. Transmission of the remaining plurality uplink transmissions that are arranged to occur outside of the pre-emption time period is caused. According to one or more embodiments of this aspect, the first uplink transmission is a segment in multi-segment uplink transmission. Transmission is caused of any segment in the multi-segment uplink transmission that is arranged to occur outside of the pre-emption time period. According to one or more embodiments of this aspect, the transmission of at least one of the segments in the multi-segment uplink transmission is based at least in part on a redundancy version of the at one of the segments. According to one or more embodiments of this aspect, the pre-emption indication is provided by downlink control information, DCI.

According to another aspect of the disclosure, a method implemented by a network node is provided. A pre-emption indication indicating a pre-emption time period for pre-empting an uplink transmission during the pre-emption time period is transmitted. The pre-emption indication causing cancellation of at least a first portion of a first uplink transmission that is arranged to occur during the pre-emption time period. If the first uplink transmission includes a second portion arranged to occur before the pre-emption time period, the pre-emption indication causes cancellation of the second portion of the first uplink transmission based on a temporal criterion being met.

According to one or more embodiments of this aspect, if the first uplink transmission includes a third portion arranged to occur after the pre-emption time period, the pre-emption indication causes cancellation of the third portion of the first uplink transmission. According to one or more embodiments of this aspect, the temporal criterion being met corresponds to a duration of a time window being greater than or equal to a processing time for the wireless device to drop the first uplink transmission, and where the duration of the time window is from reception of the pre-emption indication to the arranged start of first uplink transmission. According to one or more embodiments of this aspect, the causing of cancellation of at least the first portion of the first uplink transmission is based on the first uplink transmission being a non-RACH transmission.

According to one or more embodiments of this aspect, the cancelling of at least the first portion of the first uplink transmission being is on the first uplink transmission being a non-PUCCH transmission. According to one or more embodiments of this aspect, the first uplink transmission is one of: a physical uplink shared channel transmission; and a physical uplink control channel transmission. According to one or more embodiments of this aspect, the cancellation of at least the first portion of the first uplink transmission is based on the first uplink transmission being of a lower priority than a second uplink transmission.

According to one or more embodiments of this aspect, the first uplink transmission is part of a plurality of uplink transmissions corresponding to a multi-slot transmission repetition. According to one or more embodiments of this aspect, the first uplink transmission is a segment in multi-segment uplink transmission. According to one or more embodiments of this aspect, the pre-emption indication is provided by downlink control information, DCI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
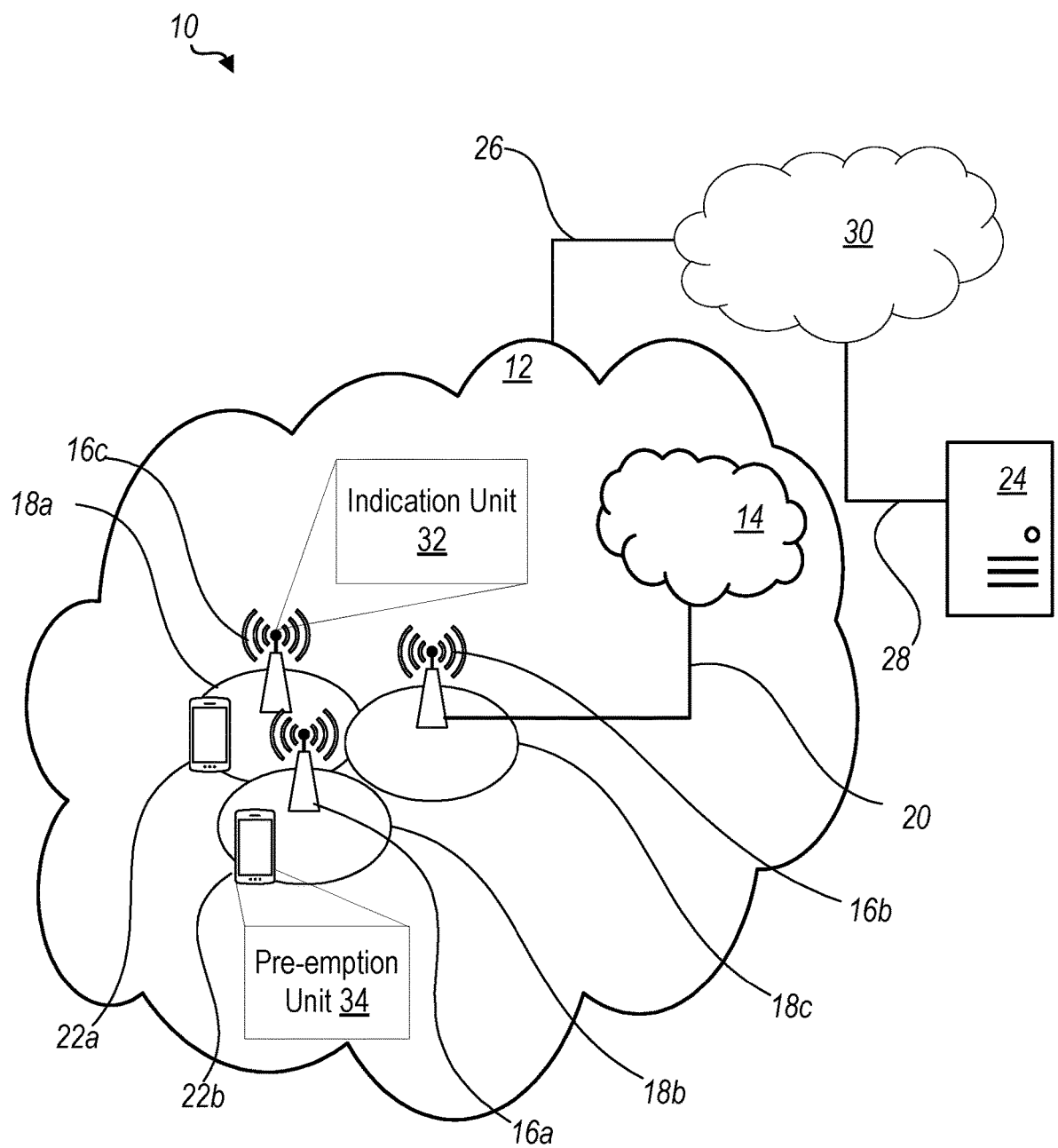
FIG. 1 is a schematic diagram of an exemplary network architecture illustrating a communication system connected via an intermediate network to a host computer according to the principles in the present disclosure.

As discussed above, a pre-emption indicator (PI) can transmitted from the network node to the interfering eMBB wireless device in order to cause the eMBB wireless device to avoid transmitting on a set of preconfigured resources. A typical use case for this approach may occur when eMBB traffic is scheduled in a whole slot and all PRBs, and time sensitive URLLC needs to be transmitted. Here, time sensitive may refer to requiring instant access to the channel where waiting until the next slot before transmission may introduce too much delay. In NR, URLLC traffic maybe be scheduled on one or a few Orthogonal frequency-division multiplexing (OFDM) symbols and with a significantly shorter time from the uplink grant to when the uplink transmission takes place than a time period in existing systems. This may indicate that the eMBB wireless devices may already have been scheduled on all available time/frequency resources. With the pre-emption indicator, the network node can choose to pre-empt the eMBB traffic and hence reduce the interference to the URLLC wireless device.

However, the details of the pre-emption indicator and the wireless device behavior upon reception of this signal/indicator are not currently defined. For example, when a wireless device is indicated to pre-empt an UL transmission for a duration of time, depending on the timing of the pre-emption indicator with respect to the start of the UL transmission, as well as the time interval of the pre-emption, the wireless device behavior for pre-empting an UL transmission need to be determined. This applies for the case of an UL transmission with or without repetition.

The instant disclosure solves at least a portion of at least one problem with existing systems at least in part by defining wireless device behavior upon reception of an uplink pre-emption indicator/indication. In one or more embodiments, the disclosure advantageously helps to effectively stop a UL transmission and allow the resources to be used by other higher priority UL transmission(s).

Before describing in detail exemplary embodiments, it is noted that the embodiments reside primarily in combinations of apparatus components and processing steps related to at least one predefined pre-emption action associated with an uplink (UL) pre-emption indication. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard and/or NR-standard. One or more carriers (e.g., uplink and/or downlink carrier/s and/or a carrier for both uplink and downlink) may be associated to a cell.

Transmitting in the downlink may pertain to transmission from the network or network node to the wireless device. Transmitting in the uplink may pertain to transmission from the wireless device to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide at least one predefined pre-emption action associated with an uplink (UL) pre-emption indication. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include an indication unit 32. A wireless device 22 is configured to include a pre-emption unit 34.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, determined, analyze, process, transmit, receive, forward, relay, etc., information related to at least one predefined pre-emption action associated with an uplink (UL) pre-emption indication.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 actions described herein such as with respect to at least one predefined pre-emption action associated with an uplink (UL) pre-emption indication.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a pre-emption unit 34 configured to perform one or more wireless device 22 actions described herein such with respect to at least one predefined pre-emption action associated with an uplink (UL) pre-emption indication.

Figure 2:
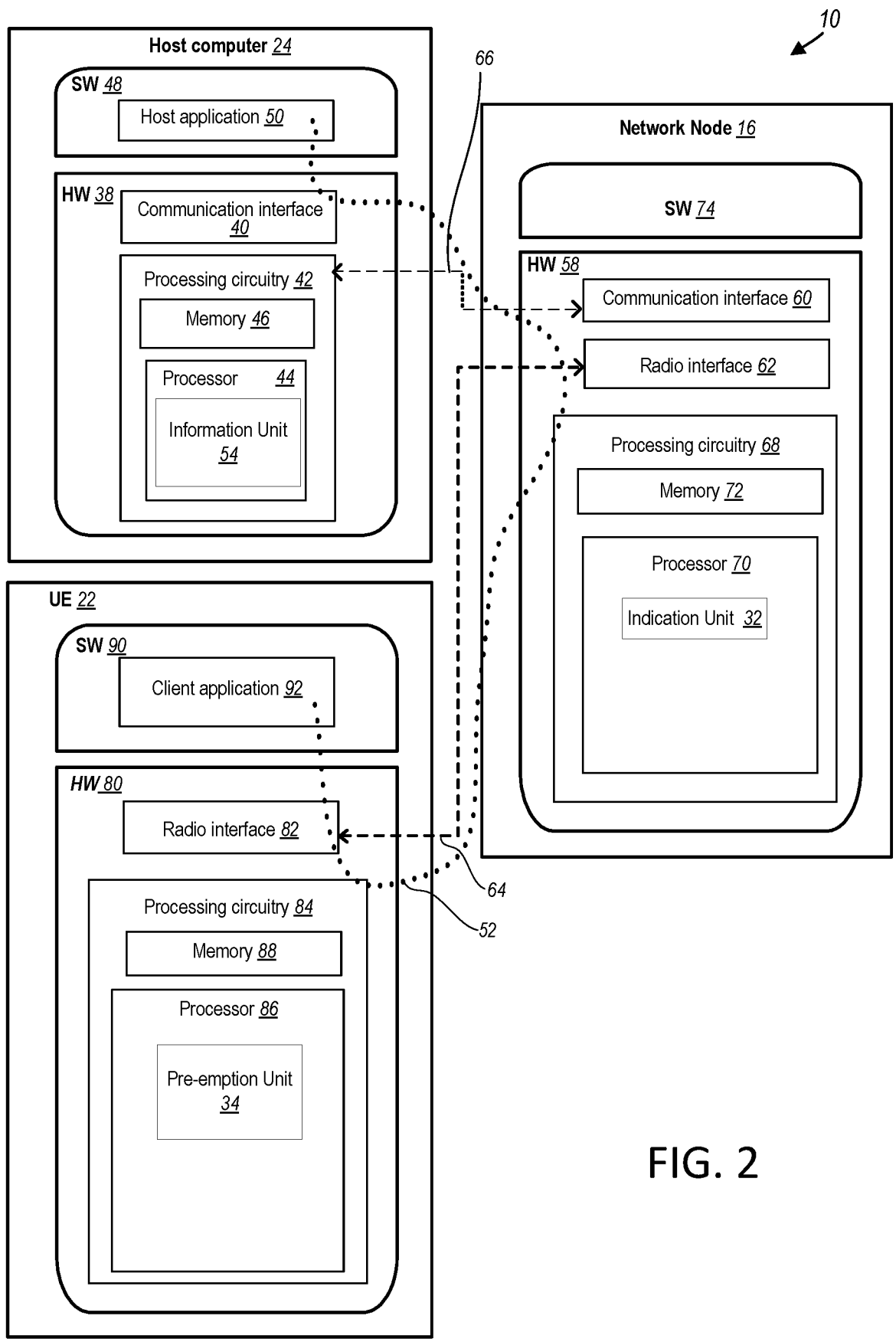
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as indication unit 32, and pre-emption unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
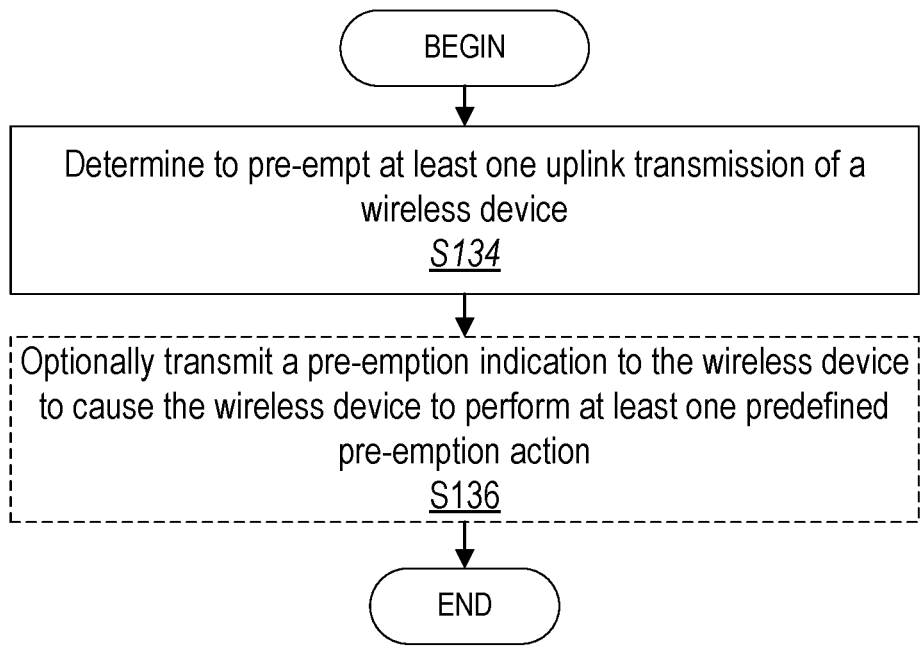
FIG. 7 is a flowchart of an exemplary process in a network node according to some embodiments of the present disclosure.

FIG. 7 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S134) to pre-empt at least one uplink transmission of a wireless device 22, as described herein. In other words, network node 16 may determine that preemption is required. In one or more embodiments, network node 16 such as via one or more of processing circuitry 68, processor 70, communication interface 60 and radio interface 62 is configured to optionally transmit (Block S136) a pre-emption indication to the wireless device 22 to cause the wireless device 22 to perform at least one predefined pre-emption action, as described herein.

According to one or more embodiments, the at least one predefined pre-emption action includes at least one of: cancelling at least a portion the pre-empted at least one uplink transmission, stopping at least a portion the pre-empted at least one uplink transmission, transmitting according to a predefined redundancy version, transmitting on at least one non-preempted time occasion and preempting a first UL transmission while allowing a second UL transmission. According to one or more embodiments, the pre-empted at least one uplink transmission overlaps another uplink transmission in at least one of time and frequency.

Figure 8:
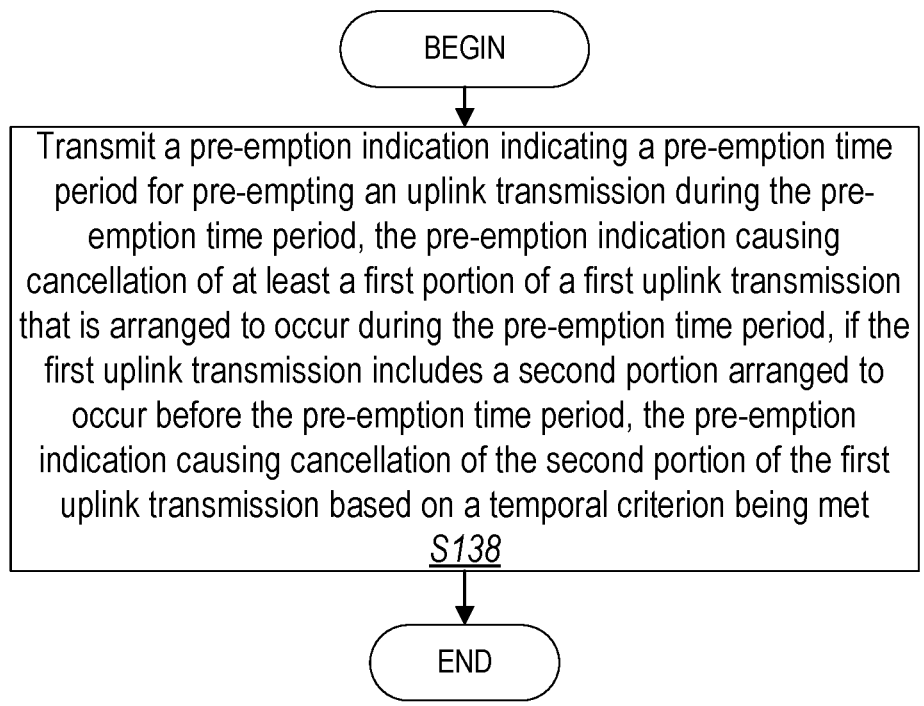
FIG. 8 is a flowchart of another exemplary process in a network node according to some embodiments of the present disclosure.

FIG. 8 is a flowchart of another example process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 such as via one or more of processing circuitry 68, processor 70, communication interface 60 and radio interface 62 is configured to transmit (Block S134) a pre-emption indication indicating a pre-emption time period for pre-empting an uplink transmission during the pre-emption time period where the pre-emption indication causes cancellation of at least a first portion of a first uplink transmission that is arranged to occur during the pre-emption time period, if the first uplink transmission includes a second portion arranged to occur before the pre-emption time period, and where the pre-emption indication causes cancellation of the second portion of the first uplink transmission based on a temporal criterion being met, as described herein.

According to one or more embodiments, if the first uplink transmission includes a third portion arranged to occur after the pre-emption time period, the pre-emption indication causes cancellation of the third portion of the first uplink transmission. According to one or more embodiments, the temporal criterion being met corresponds to a duration of a time window being greater than or equal to a processing time for the wireless device 22 to drop the first uplink transmission where the duration of the time window is from reception of the pre-emption indication to the arranged start of first uplink transmission. According to one or more embodiments, the causing of cancellation of at least the first portion of the first uplink transmission is based on the first uplink transmission being a non-RACH transmission.

According to one or more embodiments, the cancelling of at least the first portion of the first uplink transmission is based on the first uplink transmission being a non-PUCCH transmission. According to one or more embodiments, the first uplink transmission is one of: a physical uplink shared channel transmission, and a physical uplink control channel transmission. According to one or more embodiments, the cancellation of at least the first portion of the first uplink transmission is based on the first uplink transmission being of a lower priority than a second uplink transmission.

According to one or more embodiments, the first uplink transmission is part of a plurality of uplink transmissions corresponding to a multi-slot transmission repetition. According to one or more embodiments, the first uplink transmission is a segment in multi-segment uplink transmission. According to one or more embodiments, the pre-emption indication is provided by downlink control information, DCI.

Figure 9:
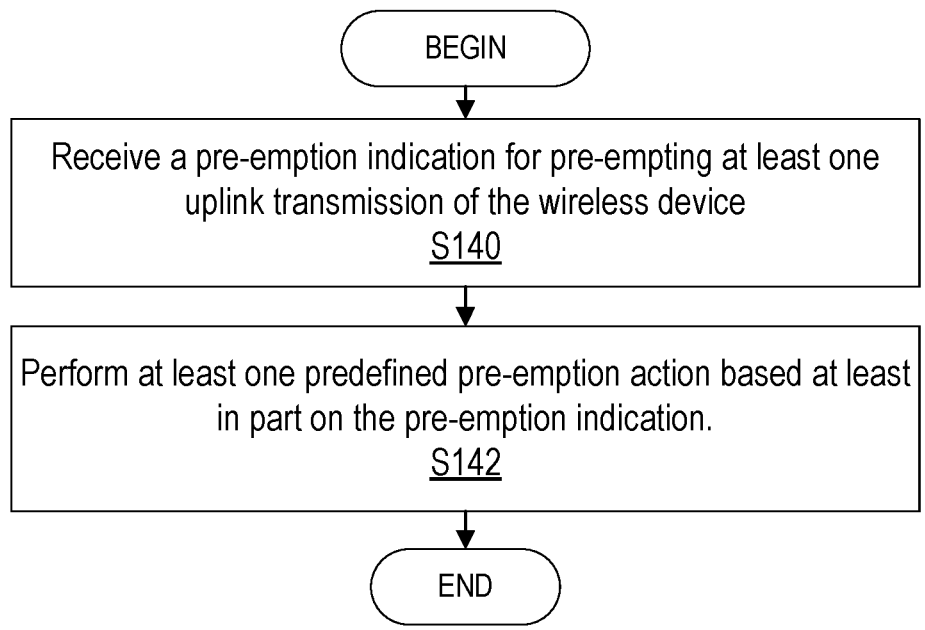
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by pre-emption unit 34 in processing circuitry 84, processor 86, radio interface 82, etc. In one or more embodiments, wireless device 22 such as via one or more of processing circuitry 84, processor 86 and radio interface 82 is configured to receive (Block S140) a pre-emption indication for pre-empting at least one uplink transmission of the wireless device 22, as described herein. In one or more embodiments, wireless device 22 such as via one or more of processing circuitry 84, processor 86 and radio interface 82 is configured to perform (Block S142) at least one predefined pre-emption action based at least in part on the pre-emption indication, as described herein.

According to one or more embodiments, the at least one predefined pre-emption action includes at least one of: cancelling at least a portion the pre-empted at least one uplink transmission, stopping at least a portion the pre-empted at least one uplink transmission, transmitting according to a predefined redundancy version, transmitting on at least one non-preempted time occasion and pre-empting a first UL transmission while allowing a second UL transmission. According to one or more embodiments, the pre-empted at least one uplink transmission overlaps another uplink transmission in at least one of time and frequency.

Figure 10:
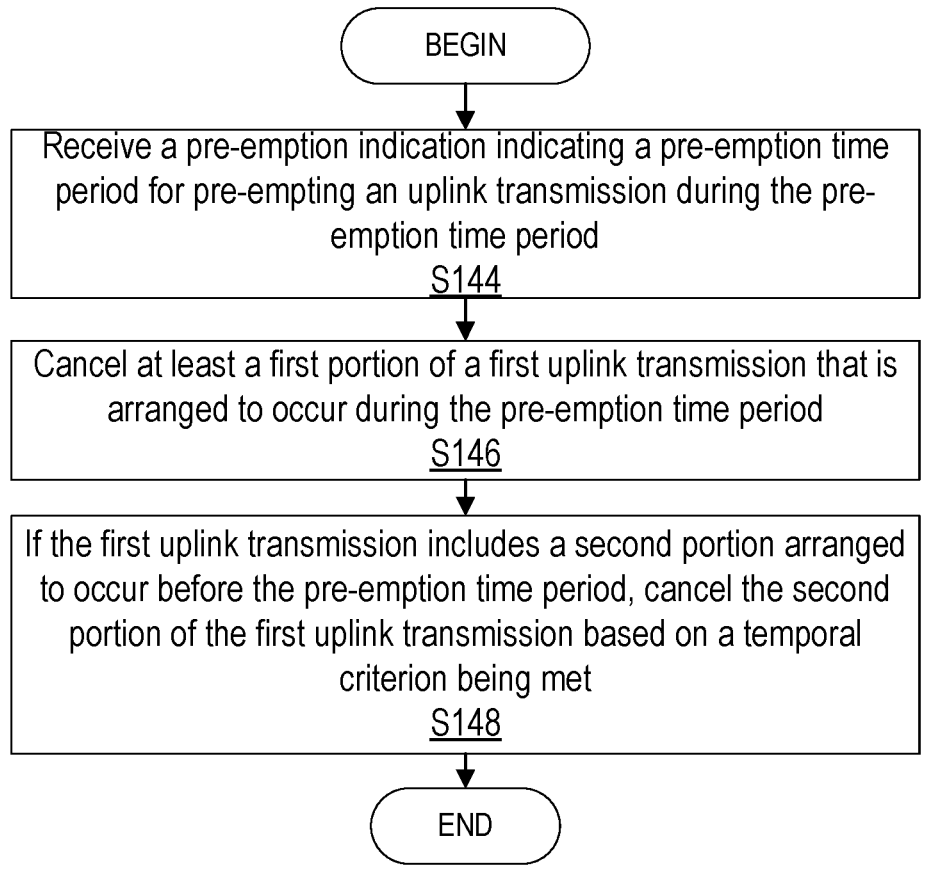
FIG. 10 is a flowchart of another exemplary process in a wireless device according to some embodiments of the present disclosure.

FIG. 10 is a flowchart of an exemplary process in a wireless device 22 according to some embodiments of the present disclosure. One or more Blocks and/or functions performed by wireless device 22 may be performed by one or more elements of wireless device 22 such as by pre-emption unit 34 in processing circuitry 84, processor 86, radio interface 82, etc. In one or more embodiments, wireless device 22 such as via one or more of processing circuitry 84, processor 86 and radio interface 82 is configured to receive (Block S144) a pre-emption indication indicating a pre-emption time period for pre-empting an uplink transmission during the pre-emption time period, as described herein. In one or more embodiments, wireless device 22 such as via one or more of processing circuitry 84, processor 86 and radio interface 82 is configured to cancel (Block S146) at least a first portion of a first uplink transmission that is arranged to occur during the pre-emption time period, as described herein. In one or more embodiments, wireless device 22 such as via one or more of processing circuitry 84, processor 86 and radio interface 82 is configured to, if the first uplink transmission includes a second portion arranged to occur before the pre-emption time period, cancel (Block S148) the second portion of the first uplink transmission based on a temporal criterion being met, as described herein.

Having generally described arrangements for at least one predefined pre-emption action associated with an uplink (UL) pre-emption indication, details for these arrangements, functions and processes are provided as follows, and which may be implemented by the network node 16, wireless device 22 and/or host computer 24 using one or more of their respective elements.

Embodiments provide at least one predefined pre-emption action associated with an uplink (UL) pre-emption indication. In one or more embodiments, the pre-emption indication is provided by and/or in the DCI. In one or more embodiments, since any inter-wireless device 22 prioritization signal can be received only by wireless devices 22 in RRC connected state, UL signals transmitted by wireless devices 22 before RRC connection may not be affected by the inter-wireless device 22 prioritization signal described herein. Inter-wireless device 22 prioritization signal may include any of:

broadcast or group-cast pre-emption indicator;
wireless device-specifically signaled pre-emption indicator; and
Power control signal.

In one or more embodiments, the UL transmitted by wireless devices 22 before RRC connection includes UL signals transmitted during RACH procedure, for example, PRACH, and any PUSCH that carries messages from wireless device 22 to network node 16 to create the connection. In the 4-step RACH procedure, PRACH is msg1, and PUSCH is msg3.

Pre-Empting Another Wireless Device 22's UL Transmission

In this section, it is assumed that one wireless device 22's higher priority UL transmission (i.e., second uplink transmission) causes pre-emption of another wireless device 22's lower priority UL transmission (i.e., first uplink transmission).

According to one or more embodiments, upon receiving, at the wireless device 22, a UL pre-emption indication for a time duration (i.e., pre-emption time period) and frequency resources, an UL signal (i.e., uplink transmission) is not transmitted by the wireless device (which may be an example of a predefined pre-emption action) if the wireless device 22 has at least one symbol within the indicated time duration, when the UL signal overlaps in frequency with the resources reserved by the UL pre-emption indication. The UL signal can be one or some of Physical Uplink Shared Channel (PUSCH), Physical Uplink Control Channel (PUCCH), Physical Random Access Channel (PRACH), Sounding Reference Signal (SRS).

Figure 11:
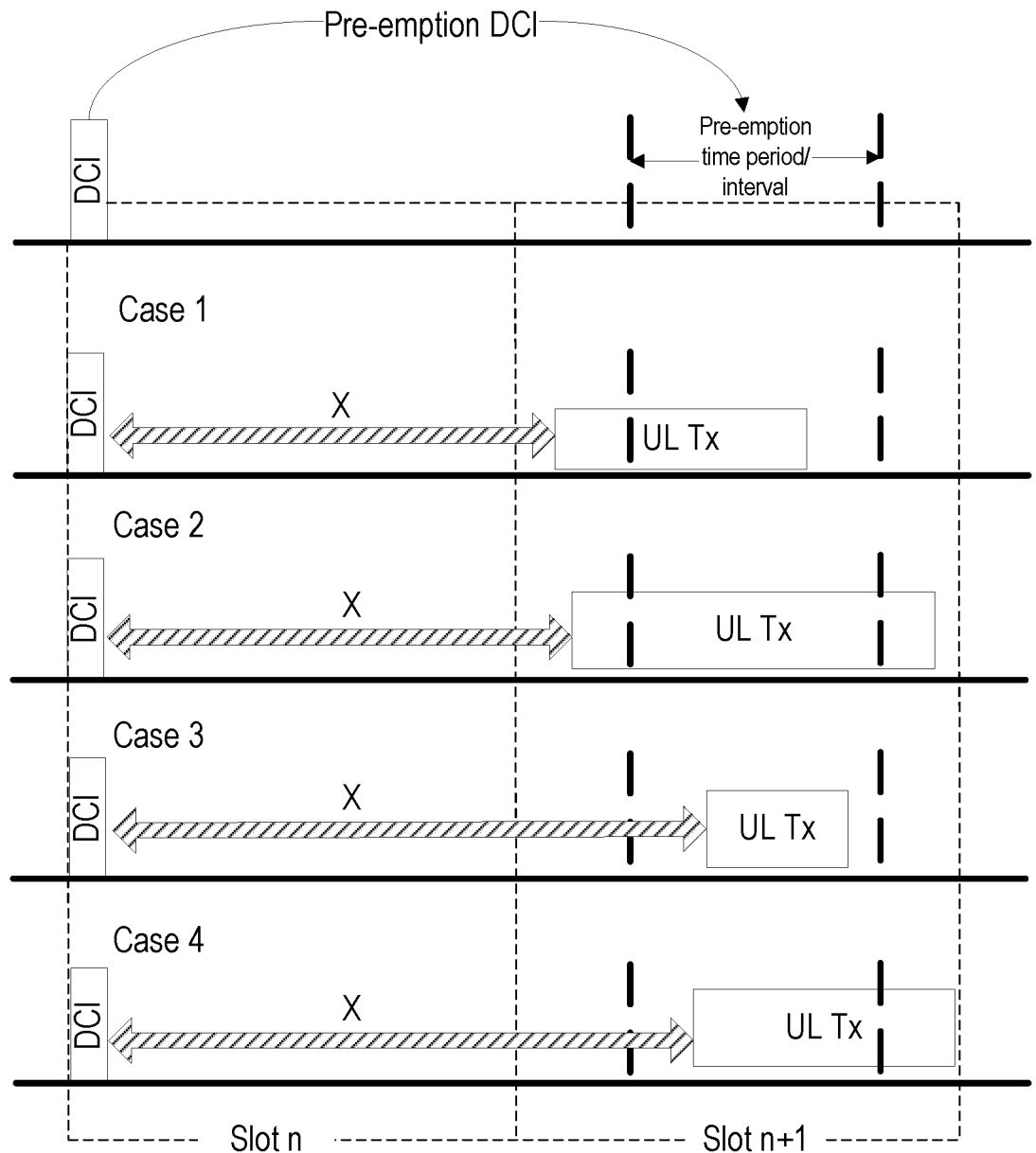
FIG. 11 is a block diagram of a pre-emption indication and time interval according to some embodiments of the present disclosure.

For example, if a wireless device 22, via processing circuitry 84 and/or radio interface 82, is supposed to start a PUSCH transmission (i.e., type of uplink transmission) at time t and for a duration of T, and the wireless device 22 receives, via radio interface 82, an indication that the wireless device 22 may pre-empt any UL transmission for a time interval (i.e., pre-emption time period) and frequency resource range that collides/overlaps with the PUSCH transmission, then the wireless device 22, via processing circuitry 84 and/or pre-emption unit 34, may not transmit the PUSCH at least in the time interval indicated by the pre-emption indicator (which may be an example of a predefined preemption action). FIG. 11 illustrates some examples for pre-emption indication in a slot and intended transmission from wireless device 22 in the slot. In particular, cases 1 to 4 demonstrate different cases of timing of a scheduled or configured UL transmission with respect to the pre-emption interval.

Figure 12:
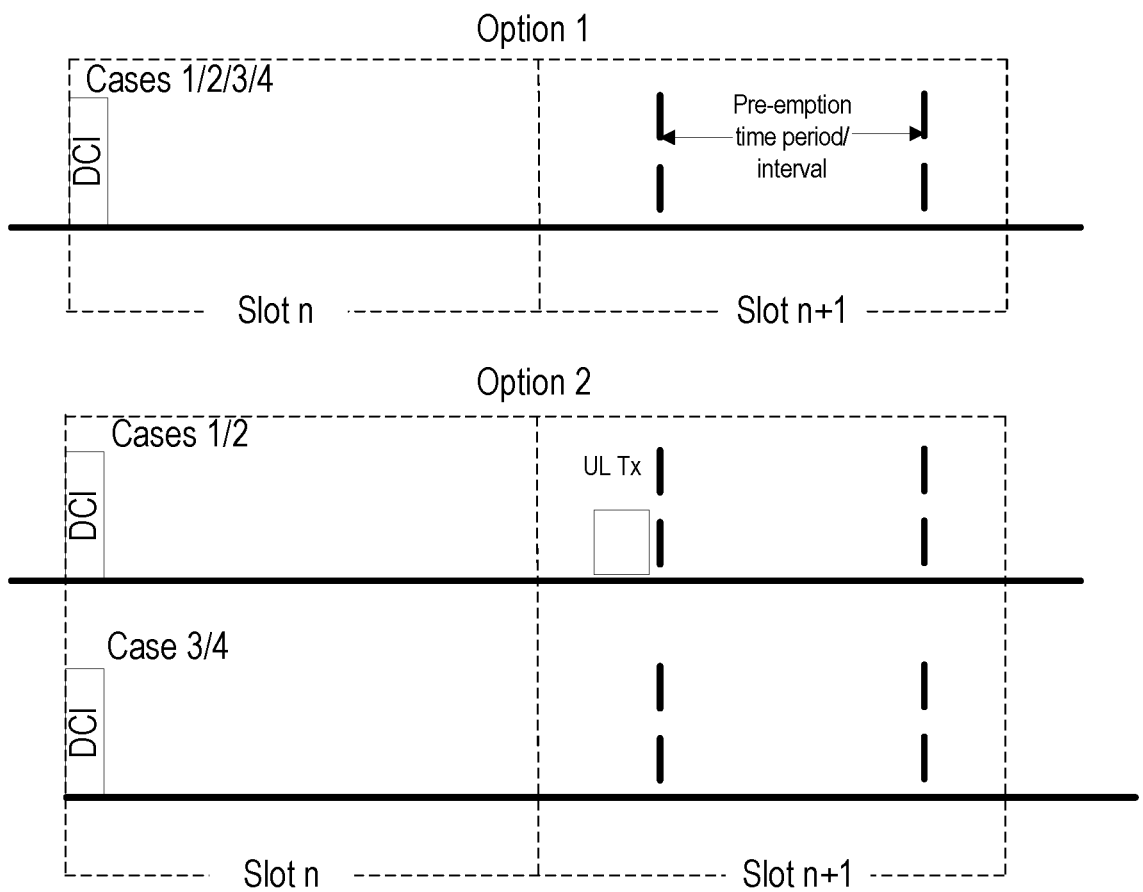
FIG. 12 is a block diagram of an outcome of pre-emption according to some embodiments of the present disclosure.

In one or more embodiments, upon reception of a pre-emption indication at the wireless device 22, if the timeline requirement (i.e., temporal criterion) for canceling the UL transmission is met, i.e., if from the reception of the pre-emption indicator until the start of the UL transmission that collides with the pre-emption interval (referred to as X in FIG. 11 and as a "duration of a time window") is not less than the time that a wireless device 22 needs for canceling and not initiating the corresponding UL transmission, the wireless device 22 is expected to cancel or drop that transmission (Option A in FIG. 12), which is an example of a predefined pre-emption action. In particular, cases 1 to 4 are based on timing X where in FIG. 11 the wireless device 22 may have enough time to cancel the UL transmission while in FIG. 12 the wireless device 22 may not have enough time for canceling a transmission, hence the ongoing transmission is stopped at least after when the timing of pre-emption starts.

Otherwise, if the timeline requirement is not met, the wireless device 22 is expected, such as by the network node 16, to mute the transmission (e.g., by reducing the power) at least from when the pre-emption indication starts and to continue until the end of the transmission (Option B in FIG. 12), which is an example of a predefined pre-emption action.

Figure 13:
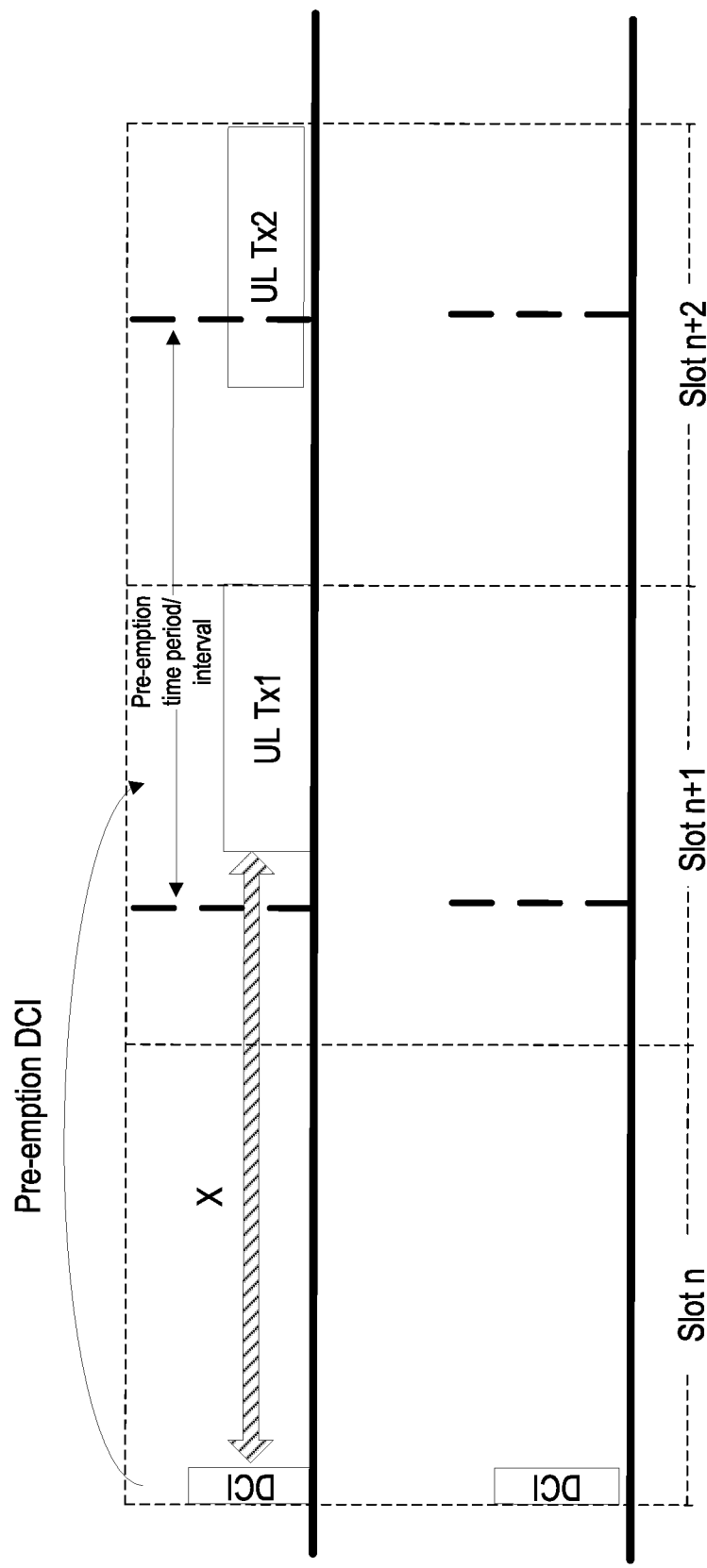
FIG. 13 is a block diagram of an example of a pre-emption indication over multiple slots according to some embodiments of the present disclosure.

Similar rules may apply when the pre-emption indication time interval (i.e., pre-emption time period) span is more than one slot. An example is illustrated in FIG. 13.

Figure 14:
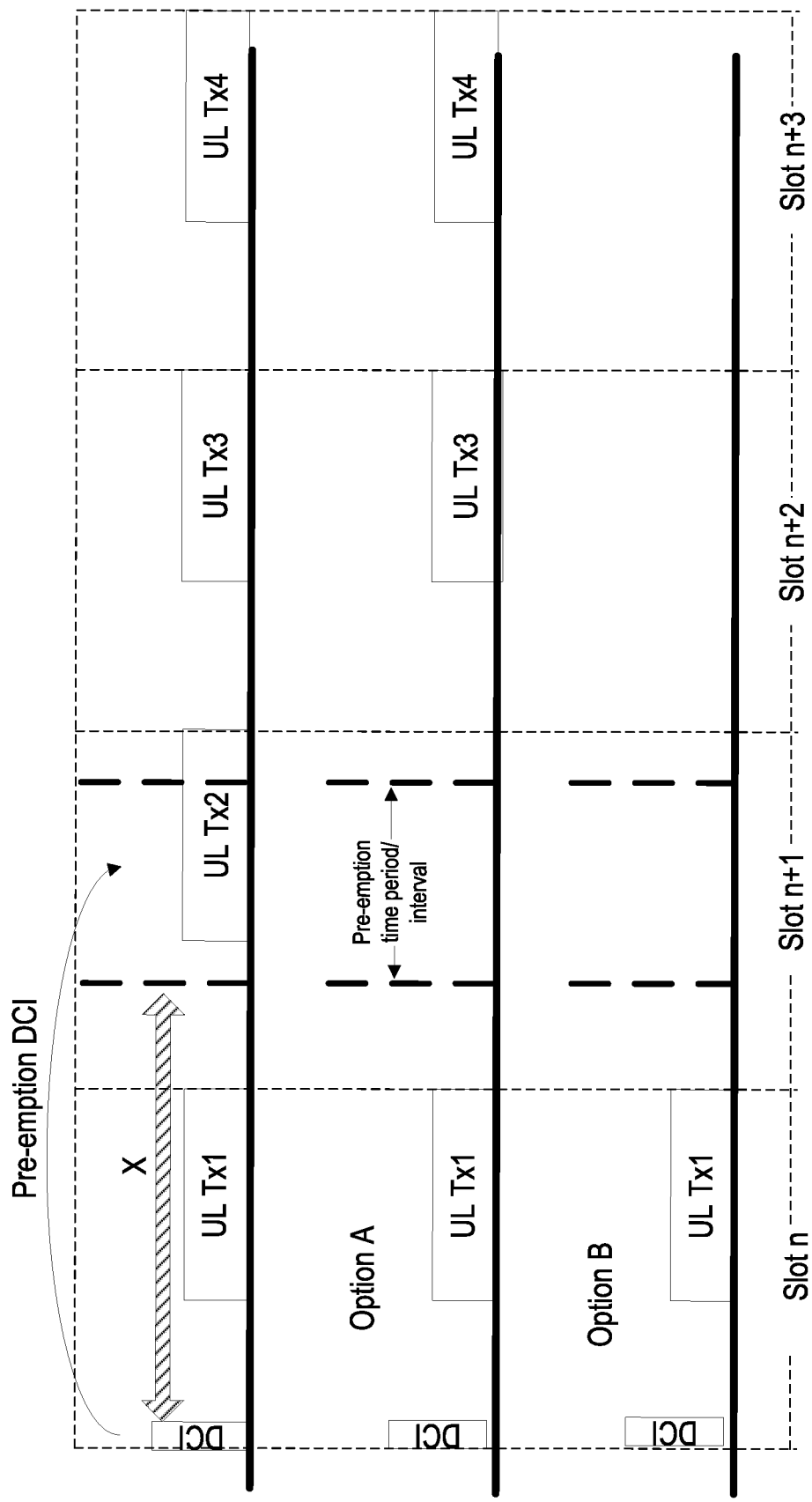
FIG. 14 is a block diagram of another example of a pre-emption indication over multiple slots according to some embodiments of the present disclosure

In one or more embodiments, if the wireless device 22 transmission, i.e. scheduled transmission, that collides partly or completely with the indicated preempted time interval, is part of a multi-slot transmission, the multi-slot transmission is canceled or stopped, such as by processing circuitry 84 and/or pre-emption unit 34, from that slots indicated to be pre-empted and onwards (which may be an example of a predefined pre-emption action) if there is any UL transmission from this multi-slot transmission (as in Option A in example illustrated in FIG. 14).

In one or more embodiments, if the wireless device 22 transmission that collides partly or completely with the indicated preempted time interval, is part of a multi-slot transmission with repetition, the multi-slot transmission is canceled or stopped, via processing circuitry 84 and/or pre-emption unit 34, only for the slots indicated to be preempted (as in Option B in example illustrated in FIG. 14), which is an example of a predefined pre-emption action.

Figure 15:
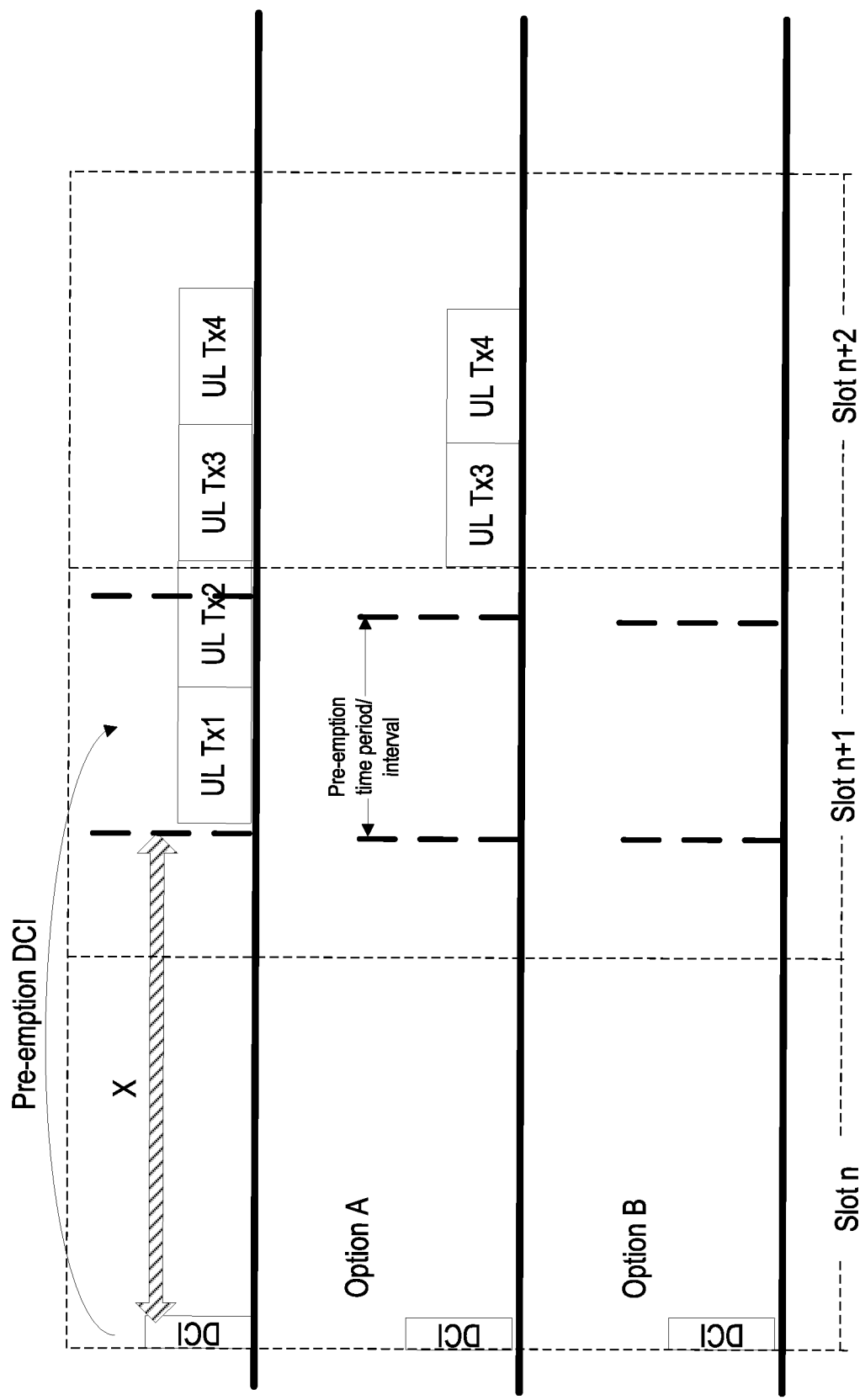
FIG. 15 is a block diagram of an example of pre-emption of multi-segments UL transmission according to some embodiments of the present disclosure.

One example is a multi-slot PUSCH or PUCCH transmission with repetition, where the allocation in one slot is repeated over multiple slots. Another example is a multi-slot transmission PUSCH transmission with different TBs (transport blocks) in each slot. A similar rule may apply to multi-segmented UL transmission over at least one slot where there can be more than one segment from the UL transmission is a slot as illustrated in FIG. 15. Examples are multi-segmented UL PUSCH by repetition or transmission of same TB with different MCS, etc., in each segment.

In one or more embodiments, a method is provided where for multi-slot UL transmission the above behavior can be used for the current slot, in a multi-slot transmission. If the wireless device 22 receives a preemption message, i.e., indication, very early in the transmission process, the wireless device 22, via processing circuitry 84 and/or pre-emption unit 34, may not transmit anything from multi-slot UL transmission (which may be an example of a predefined pre-emption action). In one alternative, the wireless device 22 transmits, via radio interface 82 and/or pre-emption unit 34, on early communication slots which can be completely transmitted but does not start transmission on the slots that are to be preempted (which may be an example of a predefined pre-emption action).

In one or more embodiments, when the pre-emption message indicates the first transmissions to be pre-empted, the wireless device 22 transmits on slots that can be completely transmitted without use the pre-empted resources and where the first transmission is self-decodable (which may be an example of a predefined pre-emption action). For example, (Redundancy Version) RV=0 and RV=3 are self-decodable and hence for Option A in FIG. 15 the UL Tx3 is transmitted if it has RV=0 or 3. If UL Tx3 was transmitted, then UL Tx4 may be transmitted irrespectively of RV. If UL Tx3 does not fulfill the at least one criterion for transmission, then UL Tx4 may be sent if RV=0 or 3.

In one example, a first uplink transmission is part of a plurality of uplink transmissions corresponding to a multi-slot transmission repetition where the wireless device 22 such as via processing circuitry 84 is configured to cause transmission of the remaining plurality uplink transmissions that are arranged to occur outside of the pre-emption time period.

Similar rules may apply for the multi-segmented UL transmission as described above. For example, in one or more embodiments, a first uplink transmission corresponds to a segment in multi-segment uplink transmission where the wireless device 22 such as via processing circuitry 84 is configured to cause transmission of any segment in the multi-segment uplink transmission that is arranged to occur outside of the pre-emption time period.

Similar to the single-slot UL transmission, for multi-slot transmission, multi-segment PUSCH repetition, and other forms of transmission with repetition, the processing timeline requirement may apply. That is, the cancellation can start after a designated minimum amount of time after the reception of the pre-emption indicator, where the wireless device performs, via processing circuitry 84 and/or pre-emption unit 34, the tasks of terminating the ongoing or scheduled UL transmission (which may be an example of a predefined pre-emption action).

One or more of the above embodiments and/or combinations of them apply to both scheduled UL transmissions such as PUSCH scheduled by Downlink control Information (DCI) or HARQ-ACK on PUCCH for PDSCH scheduled by DCI as well as configured UL transmissions such as SR on PUCCH or CSI reporting on PUCCH, or PUSCH scheduled by UL configured grant (i.e., configured PUSCH). In case of Scheduling Request (SR), the UL transmission occasions are not used if they were indicated to be preempted. In case of PUSCH scheduled by UL configured grant, this scenario is discussed below.

In another embodiment, the UL pre-emption indicator may indicate a priority level of the pre-empting signal, where transmissions overlapping with the indicated resource having a lower priority than the indicated priority level may be pre-empted. If an ongoing or scheduled transmission has the same or higher priority, the ongoing or scheduled transmission is not pre-empted by the UL pre-emption indicator (which may be an example of a predefined pre-emption action) as determined by processing circuitry 84 and/or pre-emption unit 34, for example. In one example, the UL transmission that cannot be pre-empted by the UL preemption indicator such as due to its higher priority may include one or more of the following:

PRACH transmission on the PCell. Even if a wireless device 22 receives a pre-emption signal, the wireless device 22 can ignore the pre-emption signal and start a RACH procedure on the PCell (which may be an example of a predefined pre-emption action). Such RACH procedure may be used by RRC connected wireless device 22 to repair radio link failure, repair beam failure (i.e., beam failure recovery), perform handover, obtain timing advance, etc. The PRACH can be either part of a 4-step RACH procedure or part of a 2-step RACH procedure. Therefore, in one or more embodiments, the wireless device may disregard the pre-emption indication for RACH transmission but may not be able to disregard the pre-emption indication for a non-RACH transmission.

PUSCH transmission that is part of a RACH procedure on the PCell. Therefore, in one or more embodiments, the wireless device may disregard the pre-emption indication for PUSCH transmission but may not be able to disregard the pre-emption indication for a non-PUSCH transmission;

PUCCH that carries HARQ-ACK information and/or SR (scheduling request). Therefore, in one or more embodiments, the wireless device may disregard the pre-emption indication for PUCCH transmission but may not be able to disregard the pre-emption indication for a non-PUCCH transmission; and PUSCH that carries HARQ-ACK information.

Pre-Empting PUSCH Repetitions Scheduled by UL CG

In a configured grant (CG), a wireless device 22 can be allocated K transmission occasions (TOs) for transmitting K repetitions in a period P. The repetitions can be slot or mini-slot based repetitions. The various use cases may be further divided where all the self-decodable Transmission Occasion (TO) are pre-empted. Other TOs may or may not be pre-empted. The second use case may correspond to where some self-decodable TOs remain non-preempted.

In NR Rel-15, the first TO is configured with RV 0 which is self decodable. It may also be assumed that the first TO is configured with RV 3 (which may be the case in future wireless communication standard releases) as it's also a self decodable RV.

If the first TO is pre-empted, then the wireless device 22 may check if other non-pre-empted TOs have any TO configured with RV 0 or RV 3, and perform any of the following actions (e.g., predefined pre-emption actions).

Action A—at the Least all Self-Decodable TOs are Pre-Empted

For example, a wireless device 22 is allocated K=4 TOs with RV pattern (0,2,3,1). It is assumed that TOs corresponding to RV 0 and RV 3 are pre-empted (i.e., 1st and 3rd TO). Hence following may be performed:
 a. Transmit, via radio interface 82, RV 0s in all left TOs.
 b. Transmit, via radio interface 82, RV 3s in all left TOs.
 c. Transmit, via radio interface 82, original RV pattern in all left TOs. For e.g., in the given example, the wireless device 22 transmits RV 0 repetition in the 2nd TO (originally meant for RV 2), and in the next left (i.e., 4th) TO (i.e., TO configured with RV 1), the wireless device 22 transmits repetition with RV 2 (next in the pattern).
 d. Transmit, via radio interface 82, first repetition with RV 0 and the rest as per TOs' RVs. For example, here the wireless device 22 transmits 1st repetition of RV 0 2nd TO, and the wireless device 22 transmits 2nd repetition on 4th TO with RV 1 (same RV designated to the TO).
 e. Transmit, via radio interface 82, first repetition with RV 3 and rest as per TOs' RVs. For example, the wireless device 22 transmits RV 3 repetition on 2nd TO, and the wireless device 22 transmits 2nd repetition on 4th TO with RV 1 (same RV designated to the TO).
 f. The wireless device 22 transmits, via radio interface 82, its own RV patterns and sends UCI to the network node 16 to identify the pattern.

Action B—Some Self-Decodable TOs are Pre-Empted, but Some Other TOs with Self Decodable RV Configurations Remain Non-Preempted For example, a wireless device 22 is allocated K=4 TOs with RV pattern (0,2,3,1). Let us assume a 1st TO corresponding to RV 0 is pre-empted. TO with RV 3 is not pre-empted (or with RV 0 in another example). Hence any of the following may be performed.
 a. Transmit, via radio interface 82, the repetitions as per RVs designated to the TOs. So, the first repetition is transmitted with RV 2 on the 2nd TO. The network node 16 may not decode this repetition alone. However, it can use a next repetition with RV 3 transmitted on 3rd TO to decode repetition on 2nd TO. Hence, in this example, no RV changes are done by the wireless device 22.
 b. Transmit, via radio interface 82, a first repetition with RV 0 (on TO configured with RV 2), and rest as per TOs' RVs.
 c. Transmit, via radio interface 82, a first repetition with RV 3 (on TO configured with RV 2), and rest as per TOs' RVs.
 d. Transmit, via radio interface 82, RV 0s in all left TOs.
 e. Transmit, via radio interface 82, RV 3s in all left TOs. Transmit, via radio interface 82, original RV pattern in all left TOs. For example, the wireless device 22 transmits RV 0 repetition in the 2nd TO (originally meant for RV 2), and in the next left TO (i.e., 3rd TO configured with RV 3), the wireless device 22 transmits repetition with RV 2 (next in the pattern), and in the 4th TO (originally meant for RV 1), the wireless device 22 transmits repetition of RV 3.
 g. Transmit, via radio interface 82, a first repetition with RV 0 and rest as per TOs' RVs. For example, here the wireless device 22 transmits a 1st repetition of RV 0 repetition on 2nd TO, and the wireless device 22 transmits 2nd repetition on 3rd TO with RV 3 (same RV designated to the TO), and 3rd repetition on 4th TO with RV 1 (same RV designated to the TO),
 h. Transmit, via radio interface 82, first repetition with RV 3 and rest as per TOs' RVs. For example, here the wireless device 22 transmits a 1st repetition of RV 3 repetition on 2nd TO, and the wireless device 22 transmits a 2nd repetition on 3rd TO with RV 3 (same RV designated to the TO), and 3rd repetition on 4th TO with RV 1 (same RV designated to the TO),
 i. The wireless device 22 transmits, via radio interface 82, its own RV patterns and sends UCI to the network node 16 to identify the pattern.

The same concepts described above in the "Preempting PUSCH repetitions scheduled by UL CG" section can be extended/applied for the transmissions of late arrival of CG K repetitions. For example, if UL CG traffic arrives late, it may have missed some initial TOs for the transmission, thereby leaving the remaining or left over TOs for transmission. Hence one or more embodiments discussed herein can be used again to deliver repetitions on these left over TOs. Although some of the features in this example may have similarity to the one existing method where an attempt is made to address the issue of transmitting repetitions for late arrival, the TOs described herein can be pre-empted from any portion of the CG period. In the one existing method, TOs may only be missed in the beginning in case of late arrival of the traffic.

Pre-Empting Other UL Transmission of the Same Wireless Device 22

In this embodiment, UL transmissions of the pre-empting wireless device 22 are described. When the wireless device 22 has a lower priority UL transmission that overlaps in time with its own higher-priority UL transmission, the higher priority UL transmission causes pre-emption of the same wireless device 22's lower priority UL transmission (which may be an example of a predefined pre-emption action).

One or more methods are described to help ensure that the wireless device 22 is aware that the pre-emption indicator is intended to protect its higher priority transmission. Otherwise the wireless device 22 may mistakenly cancel its own higher priority UL traffic. To achieve this "self-awareness" regarding the different priority transmissions, one or more of the following options can be used.

Option A. The pre-emption indicator, i.e., indication transmitted by network node 16, signal carries the pre-empting wireless device 22's ID (e.g., C-RNTI).

Option B. The pre-emption indicator signal carries the ID of a group of wireless devices 22, to which the pre-empting wireless device 22 belongs.

Option C. The pre-emption indicator signal carries the priority threshold of the protected UL traffic. If the pre-empting wireless device 22 has traffic with priority value above the priority threshold, then the pre-empting wireless device 22 can transmit such traffic in the which the UL traffic is allowed.

For a wireless device 22 (also referred to as UE #1) that has a mixture of high-priority and low-priority traffic, a cancellation indication may be broadcast to protect UE #1's higher priority UL transmission. In this case, UE #1's lower priority traffic is to be pre-empted by its own higher priority transmission. Any of the methods and procedures for handling pre-emption between two wireless devices 22 described herein may be applied.

Alternatively, since both higher priority and lower priority traffic belong to the same wireless device 22, the handling can be improved as follows:

In one example, the intra-wireless device 22 prioritization/multiplexing procedure can be applied instead.

In another example, the inter-wireless device 22 pre-emption procedures described in previous sections are applied, except the wireless device 22 processing time after reception of cancelation indication is no longer necessary. The wireless device 22 can perform intra-wireless device 22 prioritization, cancelation, and/or multiplexing even without the reception of the cancelation indication.

Frequency Domain Pre-Emption

In the discussions above, at least some of the analysis focused on time domain resource conflict, where it was assumed that a wireless device 22's UL signals overlaps in time with the resources reserved by the UL pre-emption indication and pre-emption may require the wireless device 22 to cancel the pre-empted signal. However, there are situations where the wireless device 22's UL signal may not be completely cancelled in the overlapped time.

Figure 16:
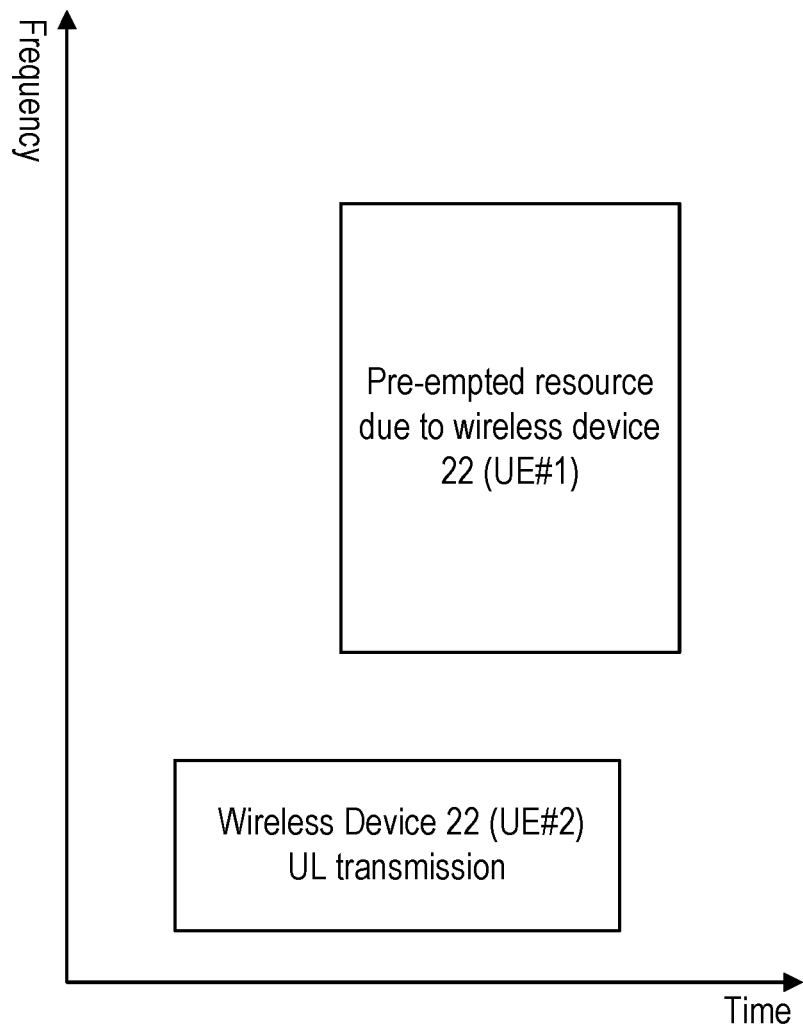
FIG. 16 is an example of UL transmission that is not pre-empted according to some embodiments of the present disclosure.

In one case, if a wireless device 22's (referred to as UE #2's) UL signal does not overlap in frequency with the resources reserved by the UL pre-emption indication for UE #1, then UE #2's UL signal is not pre-empted (which is an example of a predefined pre-emption action), even if it overlaps in time with the pre-empted resources. This is illustrated in FIG. 16.

Figure 17:
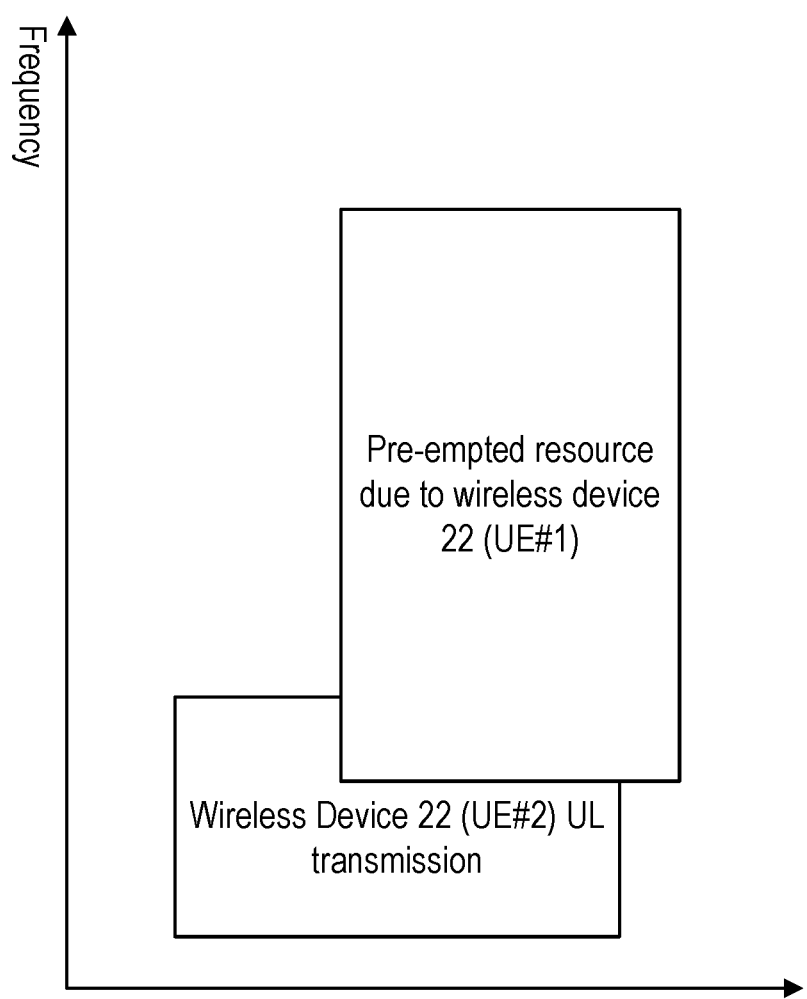
FIG. 17 is an example of UL transmission that partially overlaps in frequency with pre-empted resource according to some embodiments of the present disclosure.

In another case, if UE #2's UL signal overlap partially in frequency with the resources reserved by the UL pre-emption indication for UE #1 (as illustrated in FIG. 17), then UE #2 can perform one of the following actions (which may be examples of a predefined pre-emption action):

Alternative 1: UE #2 cancels the entire UL signal that is in conflict with the pre-empted resources;

Alternative 2: UE #2 cancels the part of UL signal that overlaps in time with the pre-empted resources. UE #2 transmits the part of UL signal that does not overlap in time with the pre-empted resources;

Alternative 3: UE #2 cancels the part of UL signal that overlaps both in time and frequency with the pre-empted resources. UE #2 transmits the remaining part of UL signal.

Note that if a wireless device 22 is capable of transmitting two UL signals simultaneously (e.g., simultaneous PUCCH and PUSCH, or two simultaneous PUSCH), then the wireless device 22 can choose, via processing circuitry 84 and/or pre-emption unit 34, any of the above alternatives when its higher priority UL transmission pre-empts its own lower priority UL transmission. On the other hand, typically a wireless device 22 may not transmit two UL signals simultaneously, hence only Alternative 1 and 2 may be possible.

Some Examples

Example A1. A network node 16 configured to communicate with a wireless device 22, the network node 16 configured to, and/or comprising a radio interface 62 and/or comprising processing circuitry 68 configured to:
determine to pre-empt at least one uplink transmission of a wireless device 22; and
optionally transmit a pre-emption indication to the wireless device 22 to cause the wireless device 22 to perform at least one predefined pre-emption action.

Example A2. The network node 16 of Example A1, wherein the at least one predefined pre-emption action includes at least one of:
cancelling at least a portion the pre-empted at least one uplink transmission;
stopping at least a portion the pre-empted at least one uplink transmission;
transmitting according to a predefined redundancy version;
transmitting on at least one non-preempted time occasion; and
pre-empting a first UL transmission while allowing a second UL transmission.

Example A3. The network node 16 of Example A1, wherein the pre-empted at least one uplink transmission overlaps another uplink transmission in at least one of time and frequency.

Example B1. A method implemented in a network node 16, the method comprising:
determining to pre-empt at least one uplink transmission of a wireless device 22; and
optionally transmitting a pre-emption indication to the wireless device 22 to cause the wireless device 22 to perform at least one predefined pre-emption action Example B2. The method of Example B1, wherein the at least one predefined pre-emption action includes at least one of:
- cancelling at least a portion the pre-empted at least one uplink transmission;
- stopping at least a portion the pre-empted at least one uplink transmission;
- transmitting according to a predefined redundancy version;
- transmitting on at least one non-preempted time occasion; and
- pre-empting a first UL transmission while allowing a second UL transmission.

Example B3. The method of Example B1, wherein the pre-empted at least one uplink transmission overlaps another uplink transmission in at least one of time and frequency.

Example C1. A wireless device 22 configured to communicate with a network node 16, the wireless device 22 configured to, and/or comprising a radio interface 62 and/or processing circuitry 68 configured to:
- receive a pre-emption indication for pre-empting at least one uplink transmission of the wireless device 22; and
- perform at least one predefined pre-emption action based at least in part on the pre-emption indication.

Example C2. The wireless device 22 of Example C1, wherein the at least one predefined pre-emption action includes at least one of:
- cancelling at least a portion the pre-empted at least one uplink transmission;
- stopping at least a portion the pre-empted at least one uplink transmission;
- transmitting according to a predefined redundancy version;
- transmitting on at least one non-preempted time occasion; and
- pre-empting a first UL transmission while allowing a second UL transmission.

Example C3. The wireless device 22 of Example C1, wherein the pre-empted at least one uplink transmission overlaps another uplink transmission in at least one of time and frequency.

Example D1. A method implemented in a wireless device 22, the method comprising:
- receiving a pre-emption indication for pre-empting at least one uplink transmission of the wireless device 22; and
- performing at least one predefined pre-emption action based at least in part on the pre-emption indication.

Example D2. The method of Example D1, wherein the at least one predefined pre-emption action includes at least one of:
- cancelling at least a portion the pre-empted at least one uplink transmission;
- stopping at least a portion the pre-empted at least one uplink transmission;
- transmitting according to a predefined redundancy version;
- transmitting on at least one non-preempted time occasion; and
- pre-empting a first UL transmission while allowing a second UL transmission.

Example D3. The method of Example D1, wherein the pre-empted at least one uplink transmission overlaps another uplink transmission in at least one of time and frequency.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices. Embodiments may be implemented on non-tangible computer readable medium such as a carrier signal that includes program code executable by a computer.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented by a wireless device, the method comprising:
    receiving a pre-emption indication indicating a pre-emption time period for pre-empting an uplink transmission during the pre-emption time period;
    cancelling at least a first portion of a first uplink transmission that is arranged to occur during the pre-emption time period based on a temporal criterion, for a period from the reception of the pre-emption indication until the start of the first uplink transmission, being met;
    if the first uplink transmission includes a second portion arranged to occur before the pre-emption time period, cancelling the second portion of the first uplink transmission based on the temporal criterion being met, the first uplink transmission being one of:
        part of a plurality of uplink transmissions corresponding to a multi-slot transmission repetition; and
        a segment in multi-segment uplink transmission; and
    based on the temporal criterion not being met, muting the transmission at least from when the pre-emption indication starts until the end of the transmission.

2. The method of claim 1, wherein the temporal criterion being met corresponds to a duration of a time window being greater than or equal to a processing time for the wireless device to drop the first uplink transmission, the duration of the time window being from reception of the pre-emption indication to the arranged start of first uplink transmission.

3. The method of claim 1, wherein the cancelling of at least the first portion of the first uplink transmission is based on the first uplink transmission being one of:
    a non-RACH transmission, and the method further comprising disregarding the pre-emption indication for RACH transmission;
    a non-PUCCH transmission, and the method further comprising disregarding the pre-emption indication for PUCCH transmission; and
    a lower priority than a second uplink transmission, and the method further comprising causing transmission of the second uplink transmission during the pre-emption time period.

4. The method of claim 1, wherein the first uplink transmission is one of:
    a physical uplink shared channel transmission; and
    a physical uplink control channel transmission.

5. The method of claim 1, wherein the pre-emption indication is provided by downlink control information, DCI.

6. A method implemented by a network node, the method comprising:
    transmitting a pre-emption indication indicating a pre-emption time period for pre-empting an uplink transmission during the pre-emption time period;
    the pre-emption indication causing cancellation of at least a first portion of a first uplink transmission that is arranged to occur during the pre-emption time period based on a temporal criterion, for a period from the reception of the pre-emption indication until the start of the first uplink transmission, being met;
    if the first uplink transmission includes a second portion arranged to occur before the pre-emption time period, the pre-emption indication causing cancellation of the second portion of the first uplink transmission based on the temporal criterion being met, the first uplink transmission being part of one of:
        a plurality of uplink transmissions corresponding to a multi-slot transmission repetition; and
        a segment in multi-segment uplink transmission; and
    based on the temporal criterion not being met, the pre-emption indication causing muting of the transmission at least from when the pre-emption indication starts until the end of the transmission.

7. The method of claim 6, wherein the temporal criterion being met corresponds to a duration of a time window being greater than or equal to a processing time for a wireless device to drop the first uplink transmission, the duration of the time window being from reception of the pre-emption indication to the arranged start of first uplink transmission.

8. The method of claim 6, wherein the causing of cancellation of at least the first portion of the first uplink transmission is based on the first uplink transmission being one of:
    a non-RACH transmission;
    a non-PUCCH transmission; and
    a lower priority than a second uplink transmission.

9. The method of claim 6, wherein the first uplink transmission is one of:
    a physical uplink shared channel transmission; and
    a physical uplink control channel transmission.

10. The method of claim 6, wherein the pre-emption indication is provided by downlink control information, DCI.

11. A non-transitory computer storage medium storing a computer program comprising instructions which when executed by a processor causes the processor to:
    receive a pre-emption indication indicating a pre-emption time period for pre-empting an uplink transmission during the pre-emption time period;
    cancel at least a first portion of a first uplink transmission that is arranged to occur during the pre-emption time period based on a temporal criterion, for a period from the reception of the pre-emption indication until the start of the first uplink transmission, being met;

if the first uplink transmission includes a second portion arranged to occur before the pre-emption time period, cancelling the second portion of the first uplink transmission based on the temporal criterion being met, the first uplink transmission being one of:
part of a plurality of uplink transmissions corresponding to a multi-slot transmission repetition; and
a segment in multi-segment uplink transmission; and
based on the temporal criterion not being met, muting the transmission at least from when the pre-emption indication starts until the end of the transmission.

12. The method of claim 1, wherein the transmission of at least one of the segments in the multi-segment uplink transmission is based at least in part on a redundancy version of the at least one of the segments.

13. The method of claim 6, wherein the transmission of at least one of the segments in the multi-segment uplink transmission is based at least in part on a redundancy version of the at least one of the segments.

14. A wireless device, comprising:
processing circuitry configured to:
receive a pre-emption indication indicating a pre-emption time period for pre-empting an uplink transmission during the pre-emption time period;
cancel at least a first portion of a first uplink transmission that is arranged to occur during the pre-emption time period based on a temporal criterion, for a period from the reception of the pre-emption indication until the start of the first uplink transmission, being met; and
if the first uplink transmission includes a second portion arranged to occur before the pre-emption time period, cancel the second portion of the first uplink transmission based on the temporal criterion being met, the first uplink transmission being one of:
part of a plurality of uplink transmissions corresponding to a multi-slot transmission repetition; and
a segment in multi-segment uplink transmission; and
based on the temporal criterion not being met, muting the transmission at least from when the pre-emption indication starts until the end of the transmission.

15. The wireless device of claim 14, wherein the transmission of at least one of the segments in the multi-segment uplink transmission is based at least in part on a redundancy version of the at least one of the segments.

16. A network node, comprising:
processing circuitry configured to:
transmit a pre-emption indication indicating a pre-emption time period for pre-empting an uplink transmission during the pre-emption time period;
the pre-emption indication causing cancellation of at least a first portion of a first uplink transmission that is arranged to occur during the pre-emption time period when a temporal criterion, for a period from the reception of the pre-emption indication until the start of the first uplink transmission, is met; and
if the first uplink transmission includes a second portion arranged to occur before the pre-emption time period, the pre-emption indication causing cancellation of the second portion of the first uplink transmission based on the temporal criterion being met, the first uplink transmission being one of:
part of a plurality of uplink transmissions corresponding to a multi-slot transmission repetition; and
a segment in multi-segment uplink transmission; and
if the temporal criterion is not met, the pre-emption indication causing muting of the transmission at least from when the pre-emption indication starts until the end of the transmission.

17. The network node of claim 16, wherein the transmission of at least one of the segments in the multi-segment uplink transmission is based at least in part on a redundancy version of the at least one of the segments.

* * * * *